(12) United States Patent
Nishi et al.

(10) Patent No.: US 10,371,821 B2
(45) Date of Patent: Aug. 6, 2019

(54) SATELLITE SIGNAL RECEPTION APPARATUS, SATELLITE SIGNAL RECEPTION METHOD AND PROGRAM THEREFOR

(71) Applicant: NIPPON TELEGRAPH AND TELEPHONE CORPORATION, Tokyo (JP)

(72) Inventors: Keisuke Nishi, Tokyo (JP); Seiji Yoshida, Tokyo (JP); Takashi Hirose, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 15/742,843

(22) PCT Filed: Jun. 17, 2016

(86) PCT No.: PCT/JP2016/068090
§ 371 (c)(1),
(2) Date: Jan. 8, 2018

(87) PCT Pub. No.: WO2017/010230
PCT Pub. Date: Jan. 19, 2017

(65) Prior Publication Data
US 2018/0196143 A1    Jul. 12, 2018

(30) Foreign Application Priority Data

Jul. 16, 2015 (JP) .................................. 2015-141958

(51) Int. Cl.
*H04B 7/185* (2006.01)
*G01S 19/22* (2010.01)

(52) U.S. Cl.
CPC .......... *G01S 19/22* (2013.01); *H04B 7/18515* (2013.01)

(58) Field of Classification Search
CPC .......................... G01S 19/22; G01S 19/42–428
(Continued)

(56) References Cited

U.S. PATENT DOCUMENTS 6,142,423 A * 11/2000 Wehner ................. B64G 1/242
244/164
6,282,426 B1 * 8/2001 Wang .................... G01S 5/0036
342/450
(Continued)

FOREIGN PATENT DOCUMENTS

JP    2008096162 A    4/2008
JP    2012118666 A    6/2012
(Continued)

OTHER PUBLICATIONS

Enik Shytermeja, Axel Javier Garcia Peña, Olivier Julien, "Proposed architecture for integrity monitoring of a GNSS/MEMS system with a Fisheye camera in urban environment", ICL-GNSS 2014, IEEE Inter. Conf. on Localization and Global Navigation Satellite Systems, Jun. 2014, Helsinki, Finland. (Year: 2014).*

(Continued)

*Primary Examiner* — Sonny Trinh
(74) *Attorney, Agent, or Firm* — Harness, Dickey & Pierce, P.L.C.

(57) ABSTRACT

A navigation satellite signal reception apparatus includes a satellite antenna; a satellite orbital information collection unit that collects orbital information of a navigation satellite; a peripheral environment spatial information collection unit that collects spatial information for a peripheral environment of an installation position of the satellite antenna; a positional information collection unit that collects positional (Continued)

information for the installation position of the satellite antenna; and a signal correction unit that performs a determination process to determine whether a navigation satellite associated with the received satellite signal is in a directly viewable state or in a non-directly-viewable state from the installation position of the satellite antenna, and that performs a correction process on a satellite signal from a navigation satellite in an NLOS state, on the assumption that the satellite signal is a reflected wave.

4 Claims, 2 Drawing Sheets

(58) Field of Classification Search
USPC .................................. 455/12.1, 12.3, 427
See application file for complete search history.

(56) References Cited

U.S. PATENT DOCUMENTS

| | | | | |
|---|---|---|---|---|
| 7,711,320 | B2* | 5/2010 | Monte ............... | H04B 7/18567 455/12.1 |
| 8,040,952 | B2* | 10/2011 | Park ................ | H04N 21/21805 375/240.01 |
| 9,304,184 | B1* | 4/2016 | Draganov ............ | G01S 19/22 |
| 10,031,235 | B2* | 7/2018 | Kamijo .............. | G01S 19/22 |
| 2003/0160863 | A1* | 8/2003 | Kakou .............. | G08B 13/19602 348/46 |
| 2008/0166011 | A1 | 7/2008 | Sever et al. | |
| 2009/0102707 | A1* | 4/2009 | Elwell, Jr. .......... | G01C 21/206 342/357.52 |
| 2010/0079332 | A1* | 4/2010 | Garin .............. | G01S 19/08 342/357.64 |
| 2015/0094952 | A1* | 4/2015 | Moeglein ............ | H04W 4/029 701/491 |
| 2015/0338524 | A1* | 11/2015 | Ben Moshe .......... | G01S 19/50 342/357.33 |
| 2016/0146945 | A1* | 5/2016 | Kamijo ............. | G01S 19/22 342/357.61 |
| 2016/0269913 | A1* | 9/2016 | Paulraj ............. | H04W 16/18 |
| 2016/0285517 | A1* | 9/2016 | Kazy .............. | H04B 5/0037 |
| 2017/0045623 | A1* | 2/2017 | Zlogar ............. | G01S 3/14 |
| 2018/0024250 | A1* | 1/2018 | Nishi .............. | G01S 19/23 342/357.62 |
| 2018/0335525 | A1* | 11/2018 | Niesen ............. | G01S 19/45 |

FOREIGN PATENT DOCUMENTS

WO  WO-2008/040896 A2  4/2008
WO  WO-2014/188919 A1  11/2014

OTHER PUBLICATIONS

Sébastien Peyraud, David Betaille, Stéphane Renault, Miguel Ortiz, FlorianMougel, et al.. "About Non-Line-Of-Sight Satellite Detection and Exclusion in a 3D Map-Aided Localization Algorithm", Sensors, MDPI, 2013, 13 (1), pp. 829-847 (Year: 2013).*
Taro Suzuki, Nobuaki Kubo, "Simulation of GNSS Satellite Availability in Urban Environments Using Google Earth", Proceedings of the ION 2015 Pacific PNT Meeting, Honolulu, Hawaii, Apr. 2015, pp. 1069-1079. (Year: 2015).*
Shree K. Naya,. "Omnidirectional Video Camera", Proc. of DARPA Image Understanding Workshop, New Orleans, May 1997. (Year : 1997).*
Keisuke Nishi et al., "Proposals of a Receiving Characteristics Estimation Method for Satellite Signal and an Efficient Installation Technique for GPS Receivers", Proceedings of the IEICE General Conference 2015, B-8-67, p. 311, with full translation.
Ken Watanabe et al., "Obstacle detection by using fish-eye camera image for GPS NLOS satellites detection", Proceedings of the 2014 JSME Conference on Robotics and Mechatronics, May 24, 2014 (May 24, 2014), pp. 992 to 994.
Hsu, L.-T. et al., "Evaluation of Multi-GNSSs and GPS with 3D Map Methods for Pedestrain Positioning in an Urban Canyon Environment", IEICE Transactions on Fundamentals of Electronics, Communications and Computer Sciences, vol. E98-A, No. 1, Jan. 1, 2015, pp. 284 to 293.
Hsu, L.-T. et al., "NLOS Correction/Exclusion for GNSS Measurement Using RAIM and City Building Models", Sensors, vol. 15, Issue. 7, Jul. 17, 2015, pp. 17329 to 17349.
Keisuke Nishi et al., "Proposal of Estimation Method of Satellite Signal Reception Characteristics for Efficient GPS Antenna setting", IEICE Technical Report, vol. 115, No. 155, Jul. 17, 2015 (Jul. 17, 2015), pp. 23 to 28.
International Search Report for PCT/JP2016/068090, ISA/JP, Tokyo, dated Aug. 16, 2016, with English translation attached.
Astuhiko Banno, "Three-dimensional Digitization of Urban Area for Mobility Robots", The Robotics and Mechatronics Conference 2014 Conference Transactions, Article 1P1-A01, Tsukuba, Japan, May 24, 2014, 4 Pages.
Office Action regarding Japanese Patent Application No. 2017-528344, dated Nov. 20, 2018.

* cited by examiner

SATELLITE SIGNAL RECEPTION APPARATUS, SATELLITE SIGNAL RECEPTION METHOD AND PROGRAM THEREFOR

CROSS-REFERENCE TO RELATED APPLICATIONS

This application is a 371 U.S. National Stage of International Application No. PCT/JP2016/068090, filed Jun. 17, 2016. This application claims the benefit of and priority to Japanese Patent Application No. 2015-141958, filed Jul. 16, 2015. The entire disclosures of the above applications are incorporated herein by reference.

TECHNICAL FIELD

The present invention relates to a satellite signal reception apparatus that receives satellite signals from satellites, a satellite signal reception method, and a program therefor.

Priority is claimed on Japanese Patent Application No. 2015-141958, filed Jul. 16, 2015, the content of which is incorporated herein by reference.

BACKGROUND ART

As the amount of mobile traffic increases, new frequencies are being assigned, and in the future, the large-scale deployment of TD-LTE (Time Division-Long Term Evolution) base stations in the 3.5 GHz band is expected. In TD-LTE systems, high-precision time synchronization (<±1.5 μs) between base stations is necessary in order to suppress the interference of signals between adjacent base stations. As means for achieving high-precision time synchronization between base stations, the use of global navigation satellite systems (GNSS) such as GPS (Global Positioning System) is growing. Navigation satellites in global navigation satellite systems carry high-precision atomic clocks that are synchronized to Coordinated Universal Time (UTC), and use radio waves to transmit navigation satellite signals that are synchronized thereto, so it is possible to synchronize the time to UTC by receiving these navigation satellite signals at any geographical point on earth.

PRIOR ART DOCUMENT

Non-Patent Document

Non-Patent Document 1: Keisuke NISHI, Youichi FUKADA, Akihiro MORITA, Seiji YOSHIDA, and Takashi HIROSE, "Proposals of a Receiving Characteristics Estimation Method for Satellite Signal and an Efficient Installation Technique for GPS Receivers", Proceedings of the IEICE General Conference 2015, B-8-67, p. 311

SUMMARY OF INVENTION

Problem to be Solved by Invention

In metropolitan areas in which there is a high demand for traffic, base stations can be expected to be installed at higher densities. However, in metropolitan areas, the environments that are well-suited to receiving the GNSS satellite signals necessary for time synchronization are limited, and there are concerns over the influence of multipath signals caused by waves being reflected or diffracted from structures in the periphery of GNSS antennas.

Additionally, regarding positioning by GNSS satellites also, for example, when positioning the current position during automated driving, there are problems in that accurate positioning can be made difficult due to the influence of multipath signals from structures such as surrounding buildings in metropolitan areas.

Reflected waves and diffracted waves are phenomena that occur when radio waves arriving from a satellite enter an antenna after being reflected or diffracted by buildings or the ground in the periphery of the reception antenna. In such cases, the propagation path length of the satellite signals change, and this seriously affects the precision of positioning and/or time measurement using GNSS signals. For example, if the propagation path length of a signal changes by 300 m, this change corresponds to a propagation delay time of approximately 1 μs. As mentioned above, a precision level of 1.5 μs or less is required for time synchronization between base stations, and if the time acquired from a GNSS signal is to be further broadcast to base stations through a network using the Precision Time Protocol (PTP) or the like, the time synchronization precision level in the GNSS receiver must be on the order of hundreds of ns, so the propagation delay time has a considerable influence. Furthermore, the conditions for occurrence of reflected waves and diffracted waves continually change from moment to moment in accordance with the positions of satellites in the sky, and also depend largely on the environment around the antenna installation position, so it is difficult to accurately predict conditions in which multipath will occur.

Conventionally, in order to reduce the influence of multipath signals, various algorithms have been considered for determining whether signals received in a GNSS receiver are direct waves or reflected waves (or diffracted waves), and for reducing the influence of reflected waves (or diffracted waves). Examples of such algorithms will be explained below.

<Algorithm Example 1>

A received signal is determined as being a direct wave or a reflected wave based on the strength of the received signal. This method makes use of the fact that the signal strength of a reflected wave will be attenuated by approximately 10 dB or more relative to a direct wave. However, this method has the problem of not being applicable to environments in which signals containing a mixture of direct waves and reflected waves are received.

<Algorithm Example 2>

In a case in which a reflected wave signal that arrives later than a direct wave signal is superimposed on the direct wave signal, the signal that arrives later is identified as the reflected wave from the waveform of a correlation signal. However, this method has the problem of not being applicable to cases in which only a reflected wave is received.

Furthermore, particularly in metropolitan areas in which structures are densely situated, the reception signals occur as complicated reflection patterns, so it is difficult to accurately distinguish between and identify direct waves and reflected waves using the aforementioned conventional methods.

The present invention was made in view of the above-mentioned problems, and provides a satellite signal reception apparatus, a satellite signal reception method, and a program therefor, which enable high-precision positioning and time measurement taking into account the propagation paths of satellite signals.

Means for Solving the Problems

In order to solve the above-mentioned problems, the satellite signal reception apparatus of the present invention that receives a satellite signal from a satellite, includes a satellite antenna that receives the satellite signal; a satellite orbital information collection unit that collects and outputs orbital information of the satellite; a peripheral environment spatial information collection unit that collects and outputs spatial information for a peripheral environment of an installation position of the satellite antenna; a positional information collection unit that collects and outputs positional information for the installation position of the satellite antenna; and a signal correction unit that performs a determination process to determine, based on the orbital information, the spatial information, and the positional information supplied from the satellite orbital information collection unit, the peripheral environment spatial information collection unit, and the positional information collection unit, whether a satellite associated with the received satellite signal is in a directly viewable (Line-of-Sight: LOS) state or in a non-directly-viewable (Non-Line-of-Sight: NLOS) state from the installation position of the satellite antenna, and that performs a correction process on a satellite signal from a satellite in an NLOS state, on the assumption that the satellite signal is a reflected wave.

Additionally, in order to solve the above-mentioned problems, the satellite signal reception method of the present invention for receiving a satellite signal from a satellite, includes a step of collecting orbital information of the satellite; a step of collecting spatial information for a peripheral environment of an installation position of the satellite antenna that receives the satellite signal; a step of collecting positional information for the installation position of the satellite antenna; a step of determining, based on the orbital information, the spatial information, and the positional information, whether a satellite associated with the received satellite signal is in a directly viewable (Line-of-Sight: LOS) state or in a non-directly-viewable (Non-Line-of-Sight: NLOS) state from the installation position of the satellite antenna; and a step of performing a correction process on the satellite signal when the satellite associated with the received satellite signal is in an NLOS state, on the assumption that the satellite signal from the satellite is a reflected wave.

Advantageous Effects of the Invention

According to the present invention, it is possible to determine whether a satellite signal from a satellite is a direct wave or a reflected wave based on whether the satellite is in an LOS state or in an NLOS state from the installation position of the satellite antenna, and to appropriately correct a satellite signal received in an NLOS state, thereby making high-precision positioning and time measurement possible.

MODES FOR CARRYING OUT THE INVENTION

Figure 1:
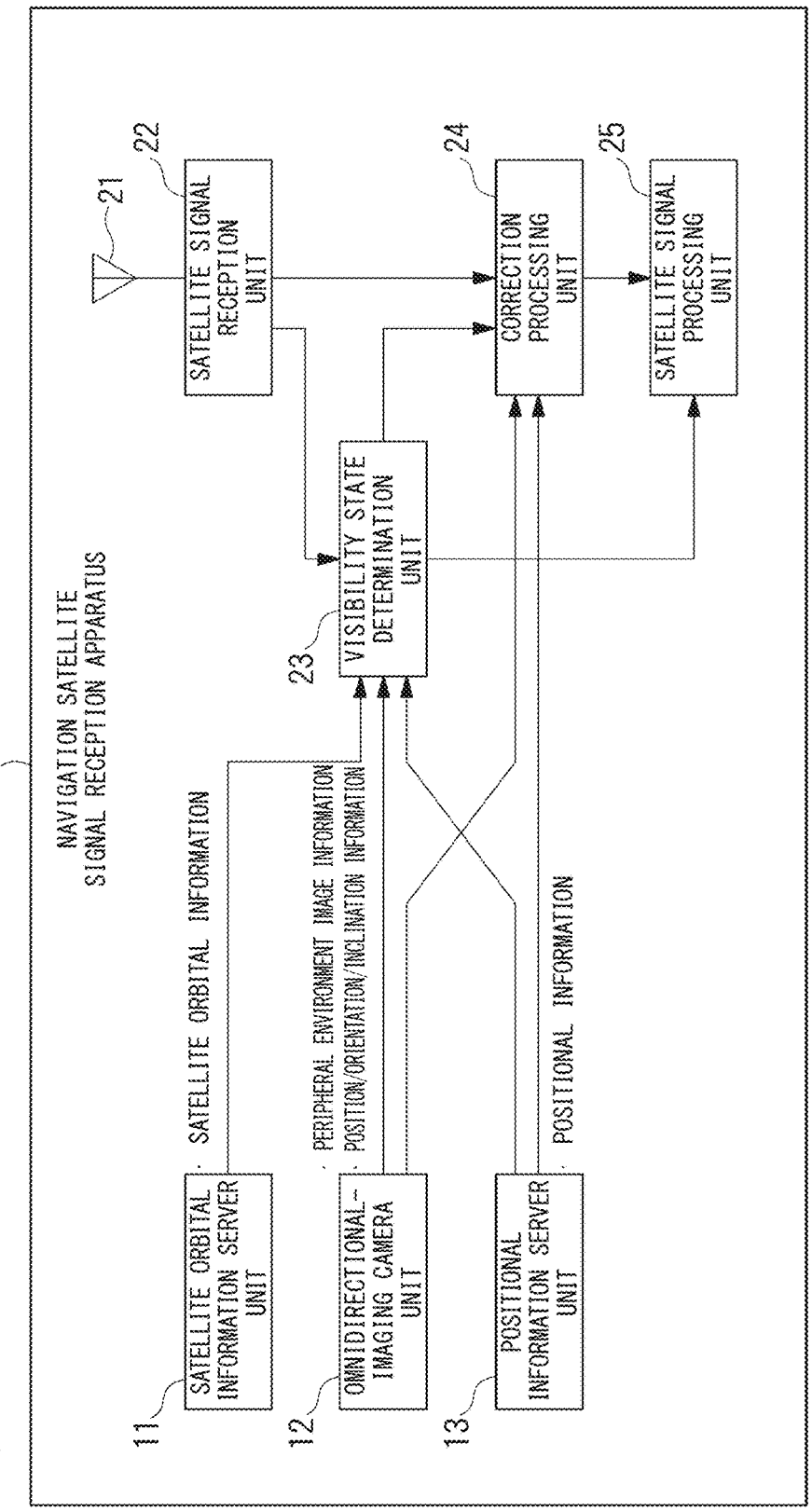
FIG. 1 is a basic schematic diagram of a navigation satellite signal reception apparatus according to the present invention.

A navigation satellite signal reception apparatus according to the present embodiment will be explained with reference to the drawings. FIG. 1 is a basic schematic diagram of the navigation satellite signal reception apparatus.

The navigation satellite signal reception apparatus 1, as shown in FIG. 1, includes a satellite orbital information server unit (satellite orbital information collection unit) 11, an omnidirectional-imaging camera unit (peripheral environment spatial information collection unit, imaging unit) 12, a positional information server unit (positional information collection unit) 13, a satellite antenna 21, a satellite signal reception unit 22, a visibility state determination unit 23, a correction processing unit (signal correction unit) 24, and a satellite signal processing unit 25.

The satellite orbital information server unit 11 collects information regarding the orbit of a navigation satellite (hereinafter referred to simply as "satellite") and supplies this information to the visibility state determination unit 23. The omnidirectional-imaging camera unit 12 captures images of the peripheral environment at the installation position of the satellite antenna 21, collects spatial information as image information, and supplies this spatial information to the visibility state determination unit 23. The positional information server unit 13 collects positional information for the installation position of the satellite antenna 21 and supplies this positional information to the visibility state determination unit 23 and the correction processing unit 24. The satellite signal reception unit 22 demodulates the navigation satellite signal (hereinafter referred to simply as "satellite signal") from a high-frequency signal received by the satellite antenna 21. The visibility state determination unit 23 determines whether the satellite associated with the received satellite signal is in a directly viewable LOS state or in a non-directly-viewable NLOS state. The correction processing unit 24 performs a correction process on a satellite signal from a navigation satellite in an NLOS state on the assumption that the satellite signal is a reflected wave. The satellite signal processing unit 25 performs prescribed processes such as positioning or time measurement based on the satellite signal that has been corrected as needed.

The constituent units shown in FIG. 1 may all be provided at the same location. Alternatively, although at least the omnidirectional-imaging camera unit 12 and the satellite antenna 21 must be provided at the same or nearby locations, it is possible to provide some of the constituent units at different locations and to transmit and receive data by connecting the constituent units over a local area network (LAN), a wide area network (WAN), or the like.

The satellite orbital information server unit 11 supplies pre-collected satellite orbital information, i.e., information regarding the positions of satellites at arbitrary times. As the satellite orbital information, it is possible to contemplate the use of almanac data, ephemeris data, or the like. Almanac data and ephemeris data for satellites are publicly available through governmental organizations such as the USCG (United States Coast Guard Navigation Center (URL: http://www.navcen.uscg.gov)) in the United States and JAXA (Japan Aerospace eXploration Agency (URL: http://qz-vision.jaxa.jp/USE/)). Additionally, satellite orbital information can also be obtained from satellite signals.

The satellite orbital information server unit 11 continually collects such published data for satellite orbital information, and updates locally held data with the collected data. The satellite orbital information is supplied to the visibility state determination unit 23, and in the visibility state determination unit 23, is converted, on the basis of the published orbital information, to satellite orbital information on a celestial sphere centered at the installation position of the satellite antenna 21, and used in the determination process as to whether the satellite is in an LOS state or an NLOS state.

The omnidirectional-imaging camera unit 12 is installed at or near the installation position of the satellite antenna 21, and captures omnidirectional image information of the peripheral environment. The omnidirectional-imaging camera unit 12 may include a plurality of cameras between which the spatial regions to be imaged are divided, or may use a fish-eye lens or the like that can capture images from all directions at once. Additionally, it is possible to use a 3D camera as mentioned below.

The image information of the peripheral environment captured by the omnidirectional-imaging camera unit 12 is supplied to the visibility state determination unit 23 and the correction processing unit 24. While the image information of the peripheral environment is projected onto the coordinates of a celestial sphere centered at the installation position of the omnidirectional-imaging camera unit 12 in at least the visibility state determination unit 23, the physical orientation and inclination may be adjusted when installing the omnidirectional-imaging camera unit 12. Alternatively, a magnetic sensor, attitude sensor, or the like may be mounted on the omnidirectional-imaging camera unit 12, and orientation and inclination information for the omnidirectional-imaging camera unit 12 may be supplied to the visibility state determination unit 23 and/or the correction processing unit 24 together with the captured image information of the peripheral environment, and the orientation and inclination may be corrected during the process of projecting the image information of the peripheral environment onto the celestial sphere in the visibility state determination unit 23 and/or the correction processing unit 24. In other words, the mapping of the information onto the coordinates of the celestial sphere may be corrected.

Additionally, the orientation and inclination may be corrected by collating the image information of the peripheral environment with 3D map data in the visibility state determination unit 23 and/or the correction processing unit 24. Aside therefrom, the orientation and inclination can be corrected by using actual measurement data for the satellite signal reception characteristics.

By using a 3D camera as the omnidirectional-imaging camera unit 12, it is possible to collect spatial 3D information surrounding the installation position of the satellite antenna 21. Additionally, a 3D laser measurer can also be used in order to obtain more detailed spatial information.

Additionally, in some cases, a GPS receiver may be mounted on the omnidirectional-imaging camera unit 12, and in such cases, instead of the positional information server unit 13, the omnidirectional-imaging camera unit 12 supplies the positional information obtained from the positioning information received by the GPS receiver to the visibility state determination unit 23 and the correction processing unit 24 (it is to be noted that in this case, the omnidirectional-imaging camera unit 12 includes both the peripheral environment spatial information collection unit and the positional information collection unit recited in the claims).

The positional information server unit 13 collects positional information for the installation position of the satellite antenna 21, i.e. the installation position of the omnidirectional-imaging camera unit 12, in the form of 3D coordinate information, and supplies this positional information to the visibility state determination unit 23 and the correction processing unit 24. Methods for generating positional information include a method of positioning by receiving satellite signals at the installation position of the satellite antenna 21, a method of generating positional information from a map database by designating a geographical point on a map, a method of generating positional information from address and floor information, and a method of inputting the positional information in the form of coordinates.

The visibility state determination unit 23 determines whether a satellite associated with a received satellite signal is in an LOS state or in an NLOS state based on the data supplied from the satellite orbital information server unit 11, the omnidirectional-imaging camera unit 12, and the positional information server unit 13, and outputs the determination results to the correction processing unit 24. The processing in the visibility state determination unit 23 will be described in detail below.

When the satellite associated with the received satellite signal is determined to be in an NLOS state by the visibility state determination unit 23, the correction processing unit 24 performs a correction process on the satellite signal, on the assumption that the satellite signal is a reflected signal. The correction process involves correcting the time information contained in the satellite signal on the basis of the data supplied from the omnidirectional-imaging camera unit 12 and the positional information server unit 13. The processing in the correction processing unit 24 will be described in detail below.

The above-described visibility state determination unit 23 determines whether a satellite is in an LOS state or an NLOS state, from the satellite orbital information supplied from the satellite orbital information server unit 11, the peripheral environment image information and the orientation and inclination information for the omnidirectional-imagine camera unit 12 supplied from the omnidirectional-imaging camera unit 12, and the positional information for the omnidirectional-imaging camera unit 12 supplied from the positional information server unit 13, in the manner described below.

(1) Calculation of Satellite Orbits on Celestial Sphere

Satellite orbits are determined by satellite orbital elements based on Kepler's laws. The satellite orbital elements include the epoch, the mean motion, the eccentricity, the orbital inclination, the right ascension of the ascending node, the argument of the perigee and the mean anomaly. The visibility state determination unit 23 calculates satellite orbits drawn on the coordinates of a celestial sphere centered at the installation point of the omnidirectional-imaging camera unit 12 on the basis of the satellite orbital information for satellites supplied from the satellite orbital information server unit 11 and the positional information of the omnidirectional-imaging camera unit 12 supplied from the positional information server unit 13. Once calculated, the orbital data may be saved in a database, not shown.

(2) Identification of Structures in Peripheral Environment

From image information of the peripheral environment at the installation position of the satellite antenna 21, captured by the omnidirectional-imaging camera unit 12, structures that pose obstacles to the reception of satellite signals and open sky having a direct view of satellite signals are identified. Methods for identifying structures and open sky include identification by differences in the tone of image information of the peripheral environment of the omnidirectional-imaging camera unit 12, identification by designating areas of open sky or structures by manual operation, and identification by estimating the positions of structures based on information such as 3D map data and information on the position, orientation, and inclination of the omnidirectional-imaging camera unit 12.

(3) Determination of LOS State or NLOS State

From the satellite orbital information for satellites on the celestial sphere centered at the installation position of the satellite antenna 21 and the results of identification of structures in the image information for the peripheral environment at the installation position of the satellite antenna 21, it is determined whether the satellite signal is in a visible state not blocked by obstacles in the periphery of the satellite antenna, i.e. in an LOS state, or in an NLOS state.

As the specific determination method, it is determined that a satellite is not in an LOS state if there is overlap between the position of a structure projected onto the celestial sphere centered at the installation position of the satellite antenna 21 and the position of the satellite projected onto the celestial sphere. Additionally, the state of overlap between the positions of structures and satellites may be determined on a so-called sky map in which information on the celestial sphere is projected onto a two-dimensional plane. In that case, the projection onto the two-dimensional plane is performed by appropriately converting the satellite orbit in accordance with the projection method that was used when capturing the images of the peripheral environment. For example, when capturing a sky map image using a fish-eye lens, projection methods such as stereographic projection and equidistant projection may be used.

When the satellite associated with the received satellite signal is determined to be in an LOS state by the visibility state determination unit 23, the above-described correction processing unit 24 does not perform a correction process, on the assumption that the satellite signal is a direct wave. In contrast, when the satellite associated with the received satellite signal is determined to be in an NLOS state by the visibility state determination unit 23, the correction processing unit 24 performs a correction process, on the assumption that the satellite signal is a reflected wave. Specifically, the correction processing unit 24 uses three-dimensional image information of the peripheral environment captured by the omnidirectional-imaging camera unit 12 or three-dimensional spatial information measured by a three-dimensional laser measurer to estimate, based on a diffracted/reflected radio wave propagation model, a propagation path of the satellite signal caused by structures in the periphery of the satellite antenna and a propagation path when assuming a direct wave from the satellite to the satellite antenna, estimates the propagation delay time due to reflection, and corrects the signal arrival time.

Figure 2:
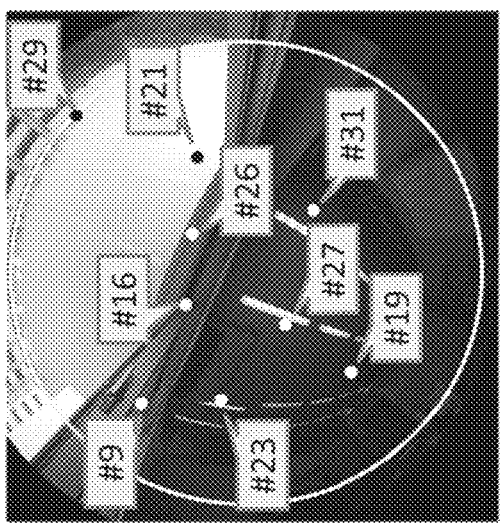
FIG. 2 is a diagram showing an example in which two satellites in an LOS state are chosen based on radio wave strength.

The satellite signal processing unit 25 is an application section of a navigation satellite system, and performs predetermined processes such as positioning and time measurement based on satellite signals from N (N being a natural number) satellites in accordance with the application thereof. In this case, when there are N or more satellites that have been determined to be in an LOS state by the visibility state determination unit 23, the satellite signal processing unit 25 performs a predetermined process based on the satellite signals from the satellites that were determined to be in an LOS state. Examples of methods for choosing N satellites from among multiple satellites that have been determined to be in an LOS state include a method of choosing satellites in the order of higher radio wave strength or higher signal-to-noise ratios (SNR), methods of choosing satellites in the order of higher elevation angles, and methods of choosing the N satellites that minimize the PDOP (Position Dilution of Precision), which is positional error information, or TDOP (Time Dilution of Precision), which is time error information. FIG. 2 shows an example in which two satellites in an LOS state are chosen based on radio wave strength.

On the other hand, when there are less than N satellites that have been determined to be in an LOS state by the visibility state determination unit 23, the satellite signal processing unit 25 performs the predetermined process by using not only satellite signals from satellites determined to be in an LOS state, but also satellite signals from satellites determined to be in an NLOS state. The method for choosing from among the satellites that were determined to be in an NLOS state in order to make up for the shortage in the satellites that were determined to be in an LOS state may, for example, be in the order of higher SNR, in the order of shorter propagation delay times in the correction processing unit 24, or in the order of higher elevation angles, and it is possible to perform positioning and/or time measurement on the basis of chosen navigation satellite signals or navigation satellite signals with propagation delay times corrected by the correction processing unit 24.

With the navigation satellite signal reception apparatus according to the present embodiment, it is possible to determine whether or not a satellite signal is a direct wave or a reflected wave based on whether a satellite associated with the satellite signal is in an LOS state or an NLOS state at the installation position of a satellite antenna 21, to prioritize the selection and use of satellites that are in an LOS state for positioning and/or time measurement, and to make appropriate corrections when using a satellite signal that is received in an NLOS state, so high-precision positioning and time measurement are made possible.

While embodiments of the present invention have been explained in detail above, the present invention is not to be construed as being limited thereto. For example, there is no restriction on the forms in which the respective units constituting the navigation satellite signal reception apparatus of the embodiment shown in FIG. 1 are provided, and it goes without saying that similar effects can be obtained even when different physical functional layouts are used for the functions of the respective units, or when the respective functions are provided in different locations. For example, all of the functions may be housed in a single apparatus, while it is also possible to contemplate a case in which some of the functions (with the exception of the omnidirectional-imaging camera unit 12) are installed at locations different from the installation site of the satellite antenna 21, and the data is transmitted and received over a WAN. Additionally, it is possible to contemplate providing the visibility state determination unit 23 on the cloud. Various other embodiments are possible.

Additionally, while a method of positioning by receiving satellite signals at an installation position of a satellite antenna 21 has been explained as an example of a method for acquiring position information in the above-mentioned embodiment, another method is to acquire, from an assisted GPS (A-GPS) server, satellite orbital data corresponding to the positional information.

While embodiments of the present invention have been explained above with reference to the drawings, it should be clear that the above-described embodiments are merely exemplifications of the present invention, and that the present invention is not to be construed as being limited to the above-described embodiments. Thus, elements may be added, removed, substituted, or otherwise modified within a range not departing from the technical scope of the present invention.

It is to be noted that the above-mentioned navigation satellite signal reception apparatus 1 may be implemented by using a computer. In that case, a program for implementing the functions thereof may be recorded onto a computer-readable recording medium, and the program may be read into and executed by a computer system. It is to be noted that a "computer system", as indicated here, includes an OS (Operating System) and hardware such as peripheral devices.

Additionally, "computer-readable recording medium" refers to portable media such as flexible disks, magneto-optic disks, ROMs (Read-Only Memory) and CD (Compact Disc)-ROMs, or memory apparatus such as hard disks that are internal to the computer system. Furthermore, "computer-readable recording medium" also includes media that only hold the program dynamically, for a short period of time, such as communication cables when the program is transmitted over a network such as the internet or over communication lines such as telephone lines, and media that hold the program for a certain period of time, such as volatile memories (RAM, Random Access Memory) inside computer systems such as servers or clients in the above-mentioned cases.

Additionally, the above-mentioned program may be transmitted from a computer system that stores the program in a memory apparatus or the like, to another computer system, via a transmission medium or by transmission waves in a transmission medium. In this case, the "transmission medium" that transmits the program refers to media having the function of transmitting information, including networks (communication networks) such as the internet or communication lines (communication cables) such as telephone lines.

Additionally, the above-mentioned program may be for implementing just some of the aforementioned functions. Furthermore, the above-mentioned program may be implemented by combining the aforementioned functions with a program that is already recorded in the computer system, such as a so-called difference file (difference program). Alternatively, the above-mentioned navigation satellite signal reception apparatus 1 may be implemented by using hardware such as a PLD (Programmable Logic Device) or an FPGA (Field Programmable Gate Array).

INDUSTRIAL APPLICABILITY

The system of the present invention is not limited to use with navigation satellites, and is applicable to satellite signals in various applications.

DESCRIPTION OF REFERENCE SIGNS

11 Satellite orbital information server unit (satellite orbital information collection unit)
12 Omnidirectional-imaging camera unit (peripheral environment spatial information collection unit, imaging unit)
13 Positional information server unit (positional information collection unit)
21 Satellite antenna
22 Satellite signal reception unit
23 Visibility state determination unit
24 Correction processing unit (signal correction unit)
25 Satellite signal processing unit

The invention claimed is:
1. A satellite signal reception apparatus that receives a satellite signal from a satellite, the satellite signal reception apparatus comprising:
   a satellite antenna that receives the satellite signal;
   a satellite orbital information collection unit that collects and outputs orbital information of the satellite;
   an omnidirectional-imaging unit that collects three-dimensional spatial information for a peripheral environment of an installation position of the satellite antenna and outputs the three-dimensional spatial information, where the three-dimensional spatial information includes data captured in all directions with respect to the installation position of the satellite antenna;
   a positional information collection unit that collects and outputs positional information for the installation position of the satellite antenna; and
   a signal correction unit that performs a determination process to determine, based on the orbital information, the three-dimensional spatial information; and the positional information supplied from the satellite orbital information collection unit, the omnidirectional-imaging unit, and the positional information collection unit, whether a satellite associated with the received satellite signal is in a directly viewable (Line-of-Sight: LOS) state or in a non-directly-viewable (Non-Line-of-Sight: NLOS) state from the installation position of the satellite antenna, and that performs a correction process on a satellite signal from a satellite in an NLOS state, on the assumption that the satellite signal is a reflected wave.

2. The satellite signal reception apparatus according to claim 1, wherein the signal correction unit calculates an arrival path of a satellite signal from the satellite in the NLOS state to the satellite antenna based on the three dimensional spatial information and the positional information supplied from the omnidirectional-imaging unit and the positional information collection unit, and performs the correction process based on the arrival path.

3. A satellite signal reception method of receiving a satellite signal from a satellite, the satellite signal reception method comprising:
   a step of collecting orbital information of the satellite;
   a step of collecting three-dimensional spatial information for a peripheral environment of an installation position of the satellite antenna that receives the satellite signal, where the three-dimensional spatial information includes data captured in all directions with respect to the installation position of the satellite antenna;
   a step of collecting positional information for the installation position of the satellite antenna;
   a step of determining, based on the orbital information, the three-dimensional spatial information, and the positional information, whether a satellite associated with the received satellite signal is in a directly viewable (Line-of-Sight: LOS) state or in a non-directly-viewable (Non-Line-of-Sight: NLOS) state from the installation position of the satellite antenna; and
   a step of performing a correction process on the satellite signal when the satellite associated with the received satellite signal is in an NLOS state, on the assumption that the satellite signal from the satellite is a reflected wave.

4. A program that makes a computer run the steps of the satellite signal reception method according to claim 3.

* * * * *